Patented July 28, 1936

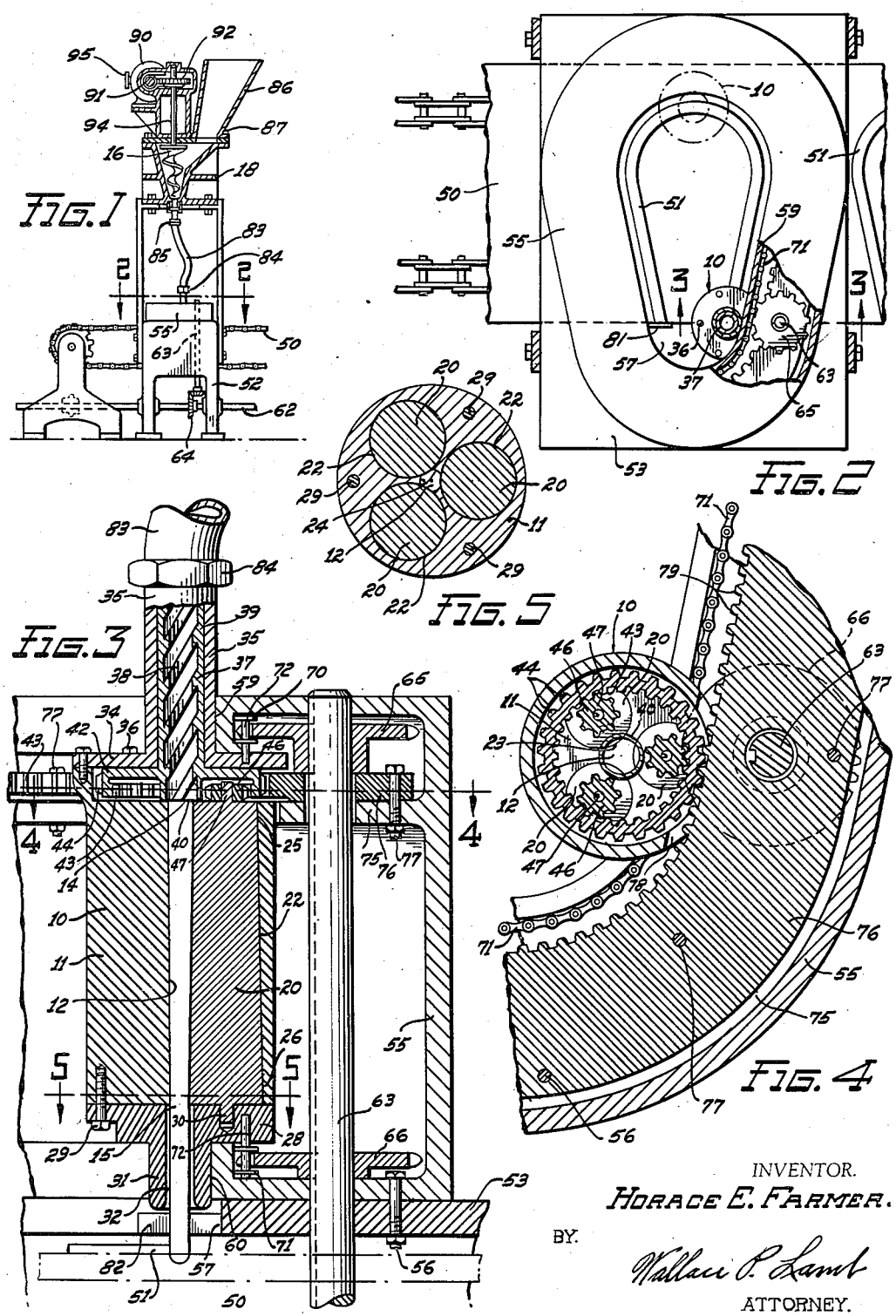

2,049,362

UNITED STATES PATENT OFFICE 2,049,362

DOUGH STRIP FEED DEVICE

Horace E. Farmer, Grosse Pointe, Mich., assignor of one-half to Federal Engineering Company, Detroit, Mich., a corporation of Michigan Application June 14, 1934, Serial No. 730,629

12 Claims. (Cl. 107—14)

This invention relates to feed devices and more particularly to apparatus for forming strip dough.

The present application constitutes a continuation in part of my prior application, Serial No. 677,667, for Improvements in pretzel making apparatus, filed June 26, 1933.

One of the objects of my invention is to provide a new and improved device for feeding dough in strip form and for doing so in a manner so that the surface of the strip is smooth and as a result will have a glazed finish when baked as is desirable in pretzel manufacturing.

Another object of the invention is to provide a new and novel discharge nozzle for metering dough in a compact and smooth surface strip.

Another object of the invention is to provide a device for feeding strip dough having a smooth surface and to provide a device for this purpose of a nature such that it may be adapted to travel over a support to deposit strip dough thereon in certain desirable shapes.

Another object of the invention is to provide a new and novel dough kneading unit.

A further object of the invention is to provide a dough strip feed device having provision for kneading the dough and for discharging the kneaded dough therefrom in a compactly formed smooth surface strip.

These and other objects of the invention will appear from the following description taken in connection with the accompanying drawing which forms a part of this specification and in which—

Fig. 1 is a view shown in side elevation of a dough strip feed device embodying my invention.

Fig. 2 is a top plan view taken along the line 2—2 of Fig. 1.

Fig. 3 is an enlarged view shown in cross section of my extruding nozzle and cooperating parts taken along the line 3—3 of Fig. 2 and Fig. 4 is a fragmentary view partly in cross section and partly in elevation taken along the line 4—4 of Fig. 3.

Fig. 5 is a view shown in cross section taken along the line 5—5 of Fig. 3.

Referring to the drawing by characters of reference, my dough strip forming apparatus comprises in general, dough feed mechanism, metering device, kneading device, and mechanism for packing the dough into a compactly formed strip having a smooth surface. The metering device includes a nozzle, designated in general by the numeral 10, having a body 11 in which is provided a passageway 12 extending centrally therethrough for the passage of dough. Preferably the passageway 12 is tapered, and tapered gradually from a relatively large inlet at 14 to a relatively small outlet at 15. Dough is fed to the passageway 12 and forced therethrough by the feed mechanism which includes an auger 16 mounted for rotation in a container or hopper 18. Any other suitable feed device may be employed such as, for example, a piston arranged in a dough container for forcing dough therefrom under pressure. As dough is forced through the gradually tapering passageway 12 it is metered from a relatively large cross sectional area to a relatively small cross sectional area and is well packed in its direction of travel or lengthwise of the strip because of the resistivity of the tapering passageway to the ready passage of dough therethrough.

In order to discharge strip dough from a nozzle-like structure and in a manner so that it is well packed and as a result kneaded, and also so that it will have a smooth surface, I provide a nozzle having movable wall portions cooperating to form the metering passageway 12. To accomplish this, I utilize the plurality of rollers 20 and arrange these rollers in the nozzle body 11 to roll the strip dough passing through the passageway thereof. The nozzle body 11 is provided with bores 22 for receiving the rollers 20, of which there are three in the present construction, and these bores are positioned about the central passageway 12, extending longitudinally therewith.

In order to roll the dough as it travels through the passageway 12, the rollers 20 are arranged so that they extend part way into the passageway, preferably throughout its length for traction with the dough. The bores 22 are positioned with relation to the passageway 12 so that they intercept portions thereof throughout its length. Thus, when the rollers 20 are in operative position in the bores 22, their roller faces cooperate with the wall portions 24 to define the tapering passageway 12 and constitute movable portions of the wall of the passageway. While I have shown and described the nozzle as having three movable wall portions or rollers, it will be understood that any number, as may be found suitable may be employed.

Preferably the rollers 20 are tapered, the bores 22 for receiving the same being tapered from a relatively small diameter 26 adjacent the inlet 14 of the passageway 12 to a relatively large diameter 25 adjacent the outlet 15. By employing tapered rollers it will be readily understood that they may be arranged to be rotated about axes parallel to the centerline of the passageway 12 which is deemed desirable, although if desired rollers of uniform diameter may be employed and arranged at an angle substantially parallel with the angle of taper of the passageway 12. In either arrangement the rollers constitute movable portions of the wall of a metering passageway, which when actuated, rotate and roll the dough strip as it advances therethrough. Thus the dough is metered and well packed because of the resistivity of the tapering passageway to its ready passage therethrough, while at the same time it is compressed towards its longitudinal center and well packed in this direction by the action of the rollers, which action also kneads the dough and rolls a smooth surface thereon.

A plate 28 is attached to the lower or discharge end of the nozzle body 11 by screws 29. The rollers 20 are supported on the upper surface of the plate 28, their shafts 30 being journaled for rotation therein. The plate 28 is formed with a nozzle-shaped extension 31 having a passageway 32 therethrough in registration with the passageway 12 of the nozzle. This passageway 32, it will be seen, is larger in diameter than the discharge end 15 of the nozzle, so that the dough is not metered in passing therethrough, the purpose of the extension being to serve as a guide for the spirally discharging dough strip when the nozzle is employed to travel over a support to deposit strip dough thereon in certain desirable shapes.

A plate 34 having a tubular extension 35 is fixed to the upper end of the nozzle body 11 by the screws 36. A kneading element 37 is provided to knead the dough as by twisting and turning it before it is kneaded by the action of the rollers 20, and this kneading element is located above the inlet end 14 having a tubular portion 39 journaled for rotation in the tubular sleeve 35. Serrations 38 are provided on the inner wall of the tubular kneader for twisting and turning the dough as it passes therethrough. The tubular kneader and the inlet 14 of the nozzle body 11 are in registration, the lower end 40 of the kneader extending to the top of the body 11 so that the dough passes directly from the kneader to the metering passageway 12.

The lower end of the rotor 37 is formed with a ring gear 42 having internal gear teeth 43 and external gear teeth 44. Gears 46 may be keyed or otherwise fixed to the shafts 47 at the upper ends of the rollers 20 for rotation therewith. These gears are in mesh with the internal gear teeth 43 of the ring gear 42 so that rotation of the ring gear drives the rollers 20 and through this planetary gear system the rollers are rotated in the same direction.

It will be understood that the rollers 20 may be actuated by any one of several well known drive mechanisms. It will also be understood at this point that the nozzle heretofore described may be employed as a stationary nozzle if desired, arranged to feed strip dough onto a conveyor 50 or other support. If the nozzle is employed as a stationary nozzle, the rollers 20 may be driven by any simple drive mechanism geared either directly to the rollers or through the ring gear 42.

In the present showing the nozzle 10 is adapted to travel as a unit over the conveyor 50, which in the present arrangement is an intermittently operated conveyor, and deposits thereon strips of dough in certain desirable shapes, as the U-shaped strip designated at 51. In making pretzels, the depositing of the dough strip in a U-shape form facilitates its being formed into the conventional pretzel shape whether done by hand or by my forming device shown in my prior application herein referred to.

A standard, designated in general by the numeral 52 may be employed having a bed plate 53 which extends over the conveyor 50. A track 55 for the traveling nozzle, in the form of a casting is mounted on the bed plate 53 and may be fixed thereto by bolts 56. The bed plate 53 is provided with an opening 57 which may conform in shape to the opening defined by the inner guide edges 59 and 60 of the track so that dough may be deposited on the conveyor 50 operating therebeneath. The nozzle 10 engages the upper inner guide face of the track at 59 and the lower guide face at 60.

The main drive shaft 62, driven by any suitable source of power such as an electric motor (not shown) is journaled in the standard 52. The main drive shaft 62 is connected to drive a driven shaft 63 through the bevel gears 64. The shaft 63 extends vertically through the bed plate 53 and through the track casting 55. A sprocket 65 is keyed to the shaft 63 adjacent the upper guide face 59 of the track and a second sprocket 66 is keyed thereto adjacent the lower guide face 60.

The track is formed to provide an upper bearing face 59 for the nozzle and a lower bearing face 60, two bearing faces being preferable so as to steady the nozzle as it travels thereabout. These flanged guide faces 59 and 60 also form tracks around which continuous chains 70 and 71 are driven by the sprockets 65 and 66 respectively. These sprockets 65 and 66, it will be seen, are arranged outside of the path of travel of the chains and mesh therewith tangentially. The nozzle is fixed to travel with the chains at one or more places by pins 72 of the chain links which are longer than the other connecting pins so as to extend into the upper and lower plates 34 and 28 respectively of the nozzle.

A ledge 75 which may be formed integral with the casting 55 extends therearound and supports a stationary gear plate 76 fixed thereto by screws 77. The inner edges of the gear plate 76 conform in general outline to the path of travel of the nozzle and has gear teeth 79 on its inner edge with which the external gear teeth 44 of the rotor or ring gear 42 mesh. The body 11 of the nozzle may be cut away as at 78 to permit the ring gear 42 to mesh with the stationary internal gear plate 76. Thus, as the nozzle travels around its path over the conveyor 50, the kneading rotor is rotated by the engagement of its external gear teeth 44 with the stationary gear plate 76, and the rollers 20 also rotated by reason of the engagement of the internal teeth 43 of the rotor with the individual gears 46 of the rollers 20.

In Fig. 2 the traveling nozzle is shown as completing a turn about its track over the conveyor and depositing the dough strip, indicated at 51, thereon. Preferably cutting edges 81 and 82 are provided to cut the dough off, both at the start of the nozzle over the conveyor and at the end of its travel thereover. These cutting edges 81 and 82 may be metallic knife edges supported as shown on the bed plate 53. With this arrangement there will be a strip of dough extruded during the travel of the nozzle about the shorter arc of the track, however, these strips may be periodically collected and returned to the hopper 18 to be again discharged through the nozzle.

It will be understood that my roller constructed nozzle herein described need not necessarily have a kneading rotor 37, for if desired the dough may be kneaded before placed in the container 18, or the kneading action of the rollers be relied upon to knead the dough. However, by the provision for kneading the dough as described, dough may be supplied to the container directly from a dough mixing machine. When the nozzle is adapted to travel, a flexible hose 83 may be provided to connect the container 18 to the nozzle 10. The hose 83 may be connected to the nozzle 10 by means of a nut 84 threaded onto the tubular shaft portion 35 of the top plate 34 of the nozzle. A rotatable coupling 85 may be employed to connect the upper end of the hose to the container so as to permit the hose to travel freely with the nozzle as it rotates about its track.

As heretofore mentioned, any one of several well known feed devices may be employed to deliver dough under pressure to the nozzle 10. In the present feed device, the auger 16 is journaled for rotation within a container or hopper 18 to which dough is supplied from a second hopper 86. The hopper 86 may be mounted on the container 18 and fixed thereto by bolts 87. Dough is placed in the hopper 86 and feeds by gravity to the auger container 16.

The auger may be driven by an electric motor indicated at 90 through a drive gear 91 in mesh with a driven gear 92 keyed or otherwise suitably fixed to the shaft 94 of the auger. Preferably a speed rheostat indicated in general at 95 is provided for the motor so that the rate of rotation of the auger may be varied so that it feeds dough to the nozzle at a rate commensurate with the rate of rotation of the rollers 20 and also with the rate of rotation or travel of the nozzle. Thus, if it is desired to increase and/or decrease the rate at which strip dough is being discharged from the nozzle, the speed of rotation of the rollers may be increased and/or decreased in conjunction with the speed of travel of the nozzle and the attendant adjust the rheostat 95 to synchronize the speed of the auger therewith.

A complete operation of my dough strip forming device is as follows. As dough is delivered by the auger 16 to the nozzle 10, it passes under pressure from the container 18 through the flexible hose 83 where it is kneaded to some extent by reason of its travel therethrough, and by the rotating travel of the hose. The dough then enters the serrated hollow rotor 37 wherein it is further kneaded by being twisted and turned as it passes therethrough. The dough then enters the metering passageway 12 wherein it is gradually reduced in cross sectional area and thus packed longitudinally of the strip. While the dough is thus advancing through the tapered passageway 12, it is at the same time compressed into a compact strip by the action of the rollers 20, constituting movable portions of the wall of the passageway, and also a smooth surface rolled thereon. As the nozzle 10 travels with the chains 70 about its track, the rollers 20 are rotated through the planetary gear system, the ring gear of the rotor 37 meshing with the stationary gear plate 76.

From the foregoing description it will now be appreciated that I have provided a new and improved dough strip feed apparatus. It will also be seen that I have provided a new and novel nozzle for metering strip dough in such a manner that it is thoroughly packed, kneaded and discharged therefrom having a smooth surface. In addition, I have provided a new and improved method for forming strip dough of the above mentioned character. Furthermore, I have provided for the extrusion of dough from a nozzle-like structure in such a manner that the strip is well packed and smooth and have provided a structure to form strip dough of this character which is adapted for travel so as to deposit the strip dough in certain desirable shapes.

Having thus fully described my invention, its utility and mode of operation, what I claim and desire to secure by Letters Patent of the United States is—

1. In a dough strip feed device, a plurality of rollers arranged with their roller faces cooperating to provide a passageway therebetween longitudinally of the roller faces, said rollers being bodily stationary and rotatable about their axes, means for delivering dough to the inlet of said passageway and for ejecting it from the outlet under pressure, and means for actuating the rollers to roll a smooth surface on the dough strip.

2. In a dough strip feed device, a plurality of rollers arranged with their axes of rotation extending in the same general direction and with their roller faces cooperating to provide a tapered passageway longitudinally of the roller faces, means for delivering dough to the inlet of said passageway and ejecting it from the outlet under pressure, and means for actuating the rollers to roll a smooth surface on the dough strip.

3. In a dough strip feed device a plurality of tapered rollers arranged with their roller faces in longitudinal juxtaposition cooperating to define a tapered passageway longitudinally of the rollers, the discharge end being formed by the relatively larger ends of the tapered rollers, and means for actuating said rollers to roll the dough into a compact smooth surface strip.

4. A traveling dough strip discharge nozzle comprising a body portion having a passageway for metering dough, the wall of said passageway including a movable portion operable for packing the dough in a compact strip, and means for operating said movable portion and actuated by travel of the nozzle.

5. A traveling dough strip discharge nozzle comprising a body portion having a passageway for dough, roller means arranged in the body with their roller faces forming a portion of the wall of the passageway at least at the discharge end thereof, and means for actuating said rollers to roll the dough into strip form and operable by travel of said nozzle.

6. In a dough strip feed device a traveling discharge nozzle comprising a body having a passage for dough, means operable for kneading the dough in the nozzle, movable means arranged in said body to form at least a portion of the metering passageway and operable for smoothing the surface of the dough strip, and means for actuating said movable means and said kneading means and operable by travel of said nozzle.

7. In a dough strip feed device, a traveling discharge nozzle comprising a body portion having a passageway therethrough for dough, a plurality of rollers within said body portion arranged therein to cooperate in rolling the dough passing through said passageway into a compact strip, and drive means operable by travel of the nozzle for actuating said rollers.

8. In a dough strip feed device a discharge nozzle comprising, a body portion having a central tapered bore therethrough, tapering from a relatively small inlet to a relatively large outlet and having a plurality of tapered bores extending longitudinally with said central bore and radially disposed in spaced relation thereabout, said plurality of spaced bores being arranged to intersect said central bore and taper in the opposite direction to the direction of taper of said central bore, a plurality of tapered rollers disposed in said plurality of tapered bores whereby portions of the roller faces project into said central bore cooperating with the wall portions of said central passageway to define a passageway for dough having movable and stationary wall portions, and means for actuating said rollers.

9. A traveling dough strip feed device, comprising a supporting means, a plurality of rollers carried by said supporting means, said rollers being arranged with their roller faces cooperating to provide a passage for dough therebetween, and means for actuating said rollers to roll said dough into a smooth surfaced strip and operable by travel of said device.

10. In a feed device, a traveling discharge nozzle, rollers carried by said nozzle for rolling material passing therethrough, drive means for moving said nozzle, and means actuated by travel of said nozzle for actuating said rollers.

11. In a feed device, a traveling discharge nozzle, rollers carried by said nozzle for rolling material passed through said nozzle and means carried by said nozzle and actuated by travel of said nozzle for actuating said rollers to roll said material.

12. In a dough strip feed device, a traveling discharge nozzle, rollers carried by said nozzle for rolling dough, passed therethrough, a rotor carried by said nozzle for kneading the dough passed through said nozzle, drive means for moving said nozzle, and means actuated by travel of said nozzle for operating said rollers and for also operating said rotor.

HORACE E. FARMER.